Nov 1, 1949.  R. R. SPAFFORD  2,486,502
APPARATUS FOR METEOROLOGICAL INSTRUCTION
Filed June 24, 1946  4 Sheets-Sheet 1
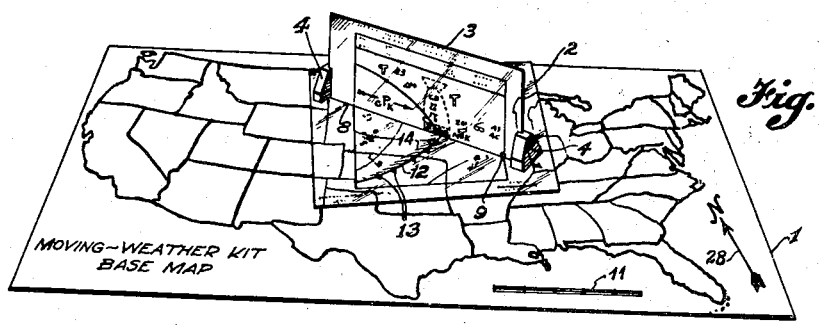
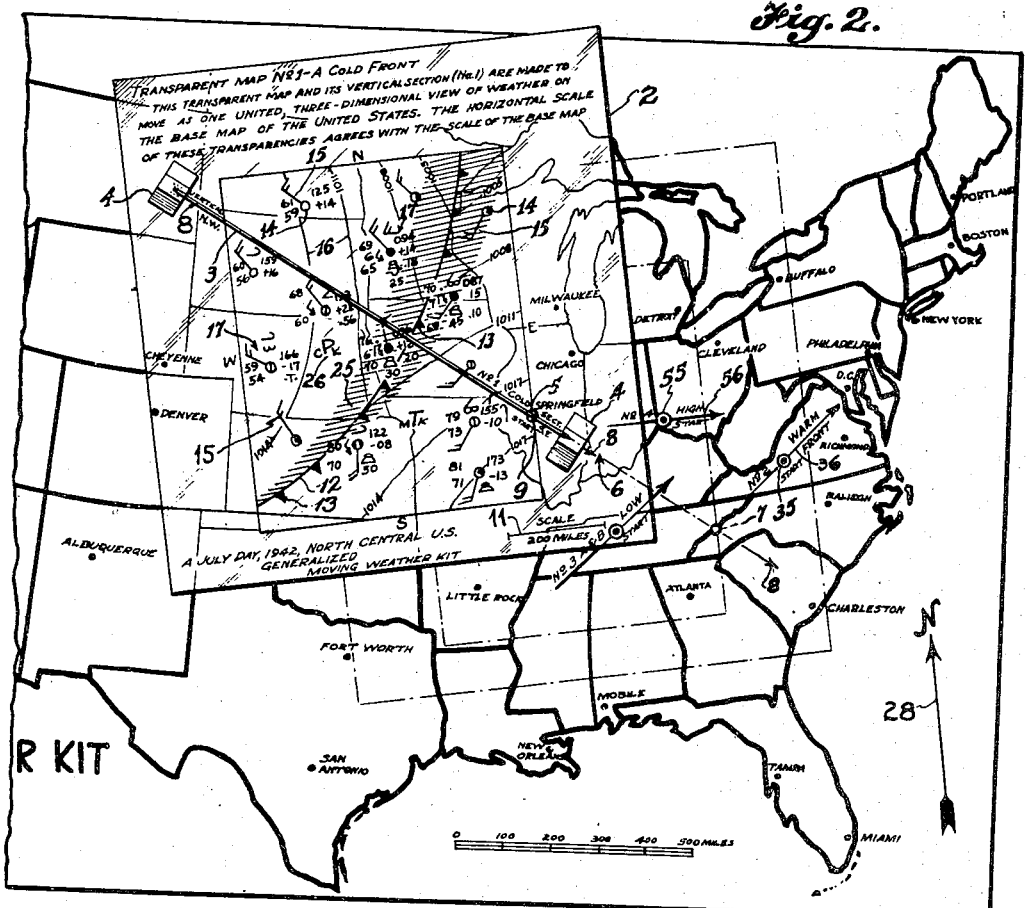
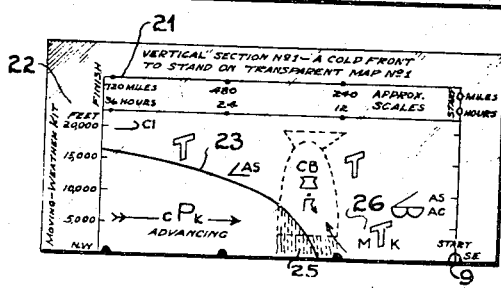
Inventor
Russell R. Spafford
By Burns & Doane
Attorneys Nov 1, 1949.  R. R. SPAFFORD  2,486,502
APPARATUS FOR METEOROLOGICAL INSTRUCTION
Filed June 24, 1946  4 Sheets-Sheet 2

Inventor
Russell R. Spafford
By Burns & Doane
Attorney

Nov 1, 1949.  R. R. SPAFFORD  2,486,502
APPARATUS FOR METEOROLOGICAL INSTRUCTION
Filed June 24, 1946
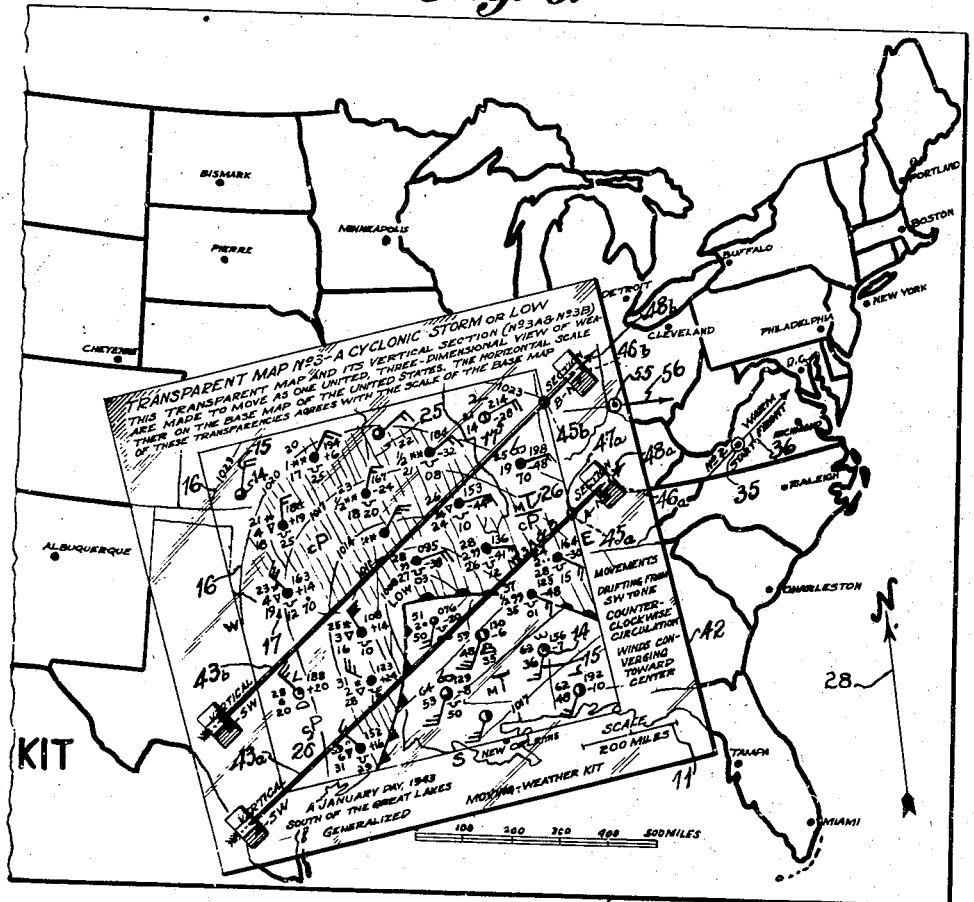
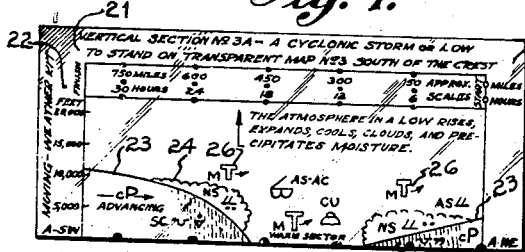
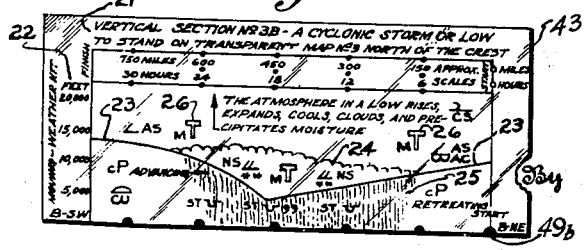
Inventor
Russell R. Spafford Nov 1, 1949.  R. R. SPAFFORD  2,486,502
APPARATUS FOR METEOROLOGICAL INSTRUCTION
Filed June 24, 1946  4 Sheets-Sheet 4

Inventor
Russell R. Spafford
By Burns + Doane
Attorneys

Patented Nov. 1, 1949

2,486,502

UNITED STATES PATENT OFFICE 2,486,502

APPARATUS FOR METEOROLOGICAL
INSTRUCTION

Russell R. Spafford, Clarksville, Tenn.

Application June 24, 1946, Serial No. 678,773

4 Claims. (Cl. 35—40)

This invention relates to methods of and apparatus for training students of meteorology. More specifically, the invention relates to methods of demonstrating the progress of meteorological conditions across a geographical area by means of apparatus in the form of novel instructional devices. Particularly, the invention is intended to provide suitable methods of and devices for instructing individuals in the four-dimensional aspects of meteorology; viz., mobile meteorological conditions as they exist in a variety of directions horizontally and vertically with respect to the earth's surface, especially as they move with respect to a selected geographical area or point.

The teaching of meteorology, particularly to individuals who require a knowledge of the time and space relationship of atmospheric conditions as they affect navigation on, across, over, or above land or water, has been difficult because of the lack of suitable apparatus to demonstrate, with any degree of reality, not only static, but also mobile meteorological conditions including the vertical as well as the horizontal disposition of those conditions with respect to either a stationary or mobile reference point. Thus, when a student of aircraft navigation, for example, wishes to learn the time and space relationship of a given meteorological condition with respect to a point of origin, at points along his course and at his ultimate destination, it has not been possible heretofore to exhibit those conditions in a manner such that a realistic time-space-location relationship could be demonstrated dynamically, as distinguished from a static representation of the relationship.

The apparatus of the present invention, in its illustrative embodiment, embraces a device including a base which may conveniently be a suitable representation of a geographical area in the form of a map. Preferably the map should represent an area over which the student intends to navigate most frequently. Associated with the map, in a manner to be described in detail hereinafter, is a chart adapted to be movably superimposed on the map in substantially horizontal disposition with respect to the surface of the map. The chart, in a suitable embodiment of the invention, includes representations of the various characteristics of typical prevailing meteorological conditions as they occur substantially at ground level over a selected area on the map. A second chart, having included thereon representations of the various characteristics of the same typical prevailing meteorological conditions as they occur above ground level within the same selected area, is disposed in a plane extending upwardly from the map as well as the first-mentioned chart. For convenience, the first-mentioned chart will be referred to hereinafter as the horizontal chart and the upwardly extending chart, as the vertical chart. Both charts include means for orientation with respect to the map and with each other whereby the charts may be moved simultaneously across the surface of the map to demonstrate the changes in meteorological conditions which occur under a given set of conditions, with respect to a specified point on the map at specified time intervals, it being understood that the map and the charts are drawn to such scales and so calibrated as to present to the student receiving the instruction a realistic illusion of weather conditions at specific locations within the selected geographical area. Thus, by moving the charts across the map to simulate movement of a typical meteorological condition, one or more individuals observing the relationship of a specific point with respect to the meteorological conditions, may learn the fundamentals and effects of mobile meteorological conditions.

For purposes of illustration, but without intending thereby to limit the scope of the invention, a suitable embodiment of the apparatus and methods of the present invention is described hereinafter and shown in the drawings which accompany the application wherein:

Figure 1 is a perspective of a typical arrangement of the parts of the apparatus of the invention;

Fig. 2 is a plan of the representation shown in Figure 1;

Figure 3 is a side elevation of the part of the apparatus which represents a vertical section of the atmospheric conditions prevailing over the map generally along the NW—SE line of Fig. 2;

Fig. 6 is a plan of the apparatus, generally similar to the views shown in Figs. 2 and 4 but representing a different set of conditions and including a plurality of vertical sections extending in generally parallel relationship substantially along a SW—NE axis;

Figs. 7 and 8 are side elevations of the generally parallel vertical sections shown in Fig. 6;

Fig. 9 is a perspective of a vertical section of substantial thickness representing a given atmospheric condition above a specified area;

Throughout the drawings and specification, like reference characters refer to like parts of the apparatus.

By way of illustration, the invention will be described hereinafter in its preferred embodiment in connection with apparatus for demonstrating the movement of typical atmospheric conditions such as a "cold front," "warm front," "cyclonic storm or 'low'" or an "anti-cyclone or 'high'" over a selected geographical area. It will be understood from the description hereinafter set forth that each of these typical atmospheric conditions normally possess characteristics peculiar to that particular condition, regardless of the topographical features of the area over which it passes, whether it be land or water. Obviously the magnitude of the dimensions of the condition will vary, for example, at different times during the day and during different seasons of the year.

An embodiment of the invention in which the condition is represented as a "cold front" is shown in Figs. 1, 2 and 3 of the drawings wherein geographical map 1, horizontal chart 2, and vertical chart 3 are so oriented as to represent graphically an air mass containing a cold front which normally moves along an axis extending generally in a southeasterly direction.

Vertical chart 3 is conveniently maintained substantially perpendicular to horizontal chart 2 by means of suitably fitted supports 4 which may be constructed of rubber, plastic, wood, or other material.

Figure 12:
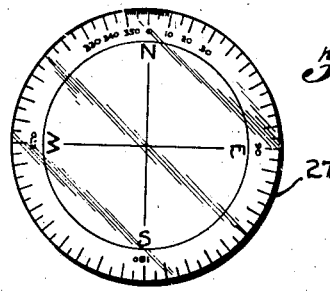
Fig. 12 is a compass rose which may be used in conjunction with the apparatus of the present invention.

The geographical map 1 is normally drawn to the same scale as the standard weather map of the Weather Bureau of the U. S. Department of Commerce. For convenience, many of the principal cities in each state are indicated by name on map 1 for the purpose of familiarizing the student with the geographical locations over which the cold front normally passes. Orienting means, including location indicator 5 and direction indicator 6 are provided on Map 1 at a location which, as shown in Fig. 2, is coincident with the city of Springfield, Illinois. For the purpose of indicating the axis of the path of movement of the air mass which contains the cold front, direction indicator 6 passes through the locating means 5 substantially in a southeasterly direction (for example, at an azimuth of approximately 125°). This axis may be accurately determined by superimposition of the conventional compass rose 27 shown in Fig. 12, upon the "north" line 28 shown on map 1.

Horizontal chart 2, as shown in Figures 1 and 2 of the drawings, includes a representation of a typical cold front as it normally exists substantially at ground level. In order that this representation of the cold front along a horizontal plane may be oriented with respect to map 1 and the axis of movement of the air mass which contains the cold front, the horizontal chart 2 is placed upon map 1 with the north-south axis of the chart, as indicated by the letters N and S thereon, substantially parallel to the north-south axis of map 1 in such manner that orienting means including location indicator 7 and direction indicator 8 on chart 2 are superimposed upon location indicator 5 and direction indicator 6, respectively, on map 1, as shown in Figure 2 of the drawings.

Horizontal chart 2 is drawn to suitable scale 11 as indicated in Fig. 2. Preferably scale 11, calibrated in miles per inch, is equal to the scale to which map 1 is drawn. This scale may conveniently be of the magnitude of approximately 160 miles per inch. In addition to the mileage scale and the north-south directional data, horizontal chart 2 includes line 12 which represents the foremost extremity of the cold front, extending approximately through Dodge City and Concordia, Kansas; Omaha, Nebraska; and Minneapolis and Duluth, Minnesota. In order that the cold front may be more easily identified as such, conventional cold front symbols 13 are provided along the forward extremity 12 of the cold front with the apex of the symbol pointing in the general direction of movement of the air mass. The cold front may be further outlined or distinguished by suitably tinting the portion of the chart representing the cold front area with a color which will distinguish it, for example, from warm front area. If desired, the area covered by the air mass containing the cold front may be tinted blue while the area covered by the air mass containing the warm front may be tinted red. In each case, however, it is preferred to maintain translucence of the chart notwithstanding the coloring thereof.

Horizontal chart 2 may also carry conventional weather reporting symbols such as cloud and wind condition legends 14 and 15, isobars 16, and miscellaneous meteorological data 17, including barometric characteristics, precipitation, clouds, past weather, etc.

In order that the atmospheric conditions existing above ground level may also be represented in graphic fashion, vertical chart 3, with supports 4 disposed at each end of chart 3 in the manner shown in Figs. 1 and 2, is placed upon horizontal chart 2 in such manner that the orienting means including location indicator 9 on vertical chart 3 coincide with location indicator 7 of horizontal chart 2 as well as location indicator 5 on map 1. Moreover, the longitudinal axis of vertical chart 3 is disposed to coincide with direction indicator 8 of horizontal chart 2 as well as direction indicator 6 of map 1 so that the letters SE on vertical chart 3 will be nearest the southeast corner of map 1 and the letters NE will be nearest the northeast corner of map 1. It will be observed that when vertical chart 3 is thus oriented with respect to horizontal chart 2 and map 1, the plane represented by vertical chart 3 not only extends upwardly from horizontal chart 2 but also is substantially parallel to or coincident with the normal axis of movement of the air mass which contains the cold front.

Vertical chart 3 carries meteorological data corresponding to that carried by chart 2, including cold front 12 and its upper limit 23, cloud symbols 24, and other miscellaneous meteorological data, including identification of the air mass, for example, by the legend cPk (indicating a polar continental air mass), mTk (representing a subtropical air mass), etc. all of which are identified generally by the reference character 26. Vertical chart 3 is calibrated on a horizontal scale equal to that of horizontal chart 2, as indicated by mileage and time scale 21; however, the vertical scale 22 of vertical chart 3, calibrated in thousands of feet per inch, is on a scale of a magnitude such that the representation of the vertical axis of the air mass will be out of proportion to the horizontal scale to which the air mass is drawn. At the scale shown on vertical chart 3 in Fig. 3, the vertical scale may conveniently be approximately 13,000 feet per inch. By employing a vertical scale of this magnitude in conjunction with the smaller scale of the map, it is possible to convey to a student a realistic representation of the atmospheric conditions without the necessity of employing extremely large charts to represent the corresponding geographical area over which the meteorological condition passes.

A convenient method of instructing students with the apparatus of the present invention involves orientation of the apparatus in the manner hereinbefore described and movement of those portions which represent characteristic meteorological conditions, over the selected geographical area substantially along the axis of movement of the air mass represented by the apparatus. In this manner, the student may observe the manner in which the meteorological conditions change with respect to a specific geographical location, as well as to enable the student to visualize the movement of such meteorological conditions with respect to either a point of origin or destination with which the student is concerned.

Normally the horizontal chart 2 is moved substantially parallel to or coincident with the axis of movement of the air mass; i. e., in the direction indicated by the arrow at the end of direction indicator 6. Inasmuch as vertical chart 3 rests upon horizontal chart 2, it is carried with the horizontal chart as it is moved over the surface of the map. It will be seen that after an interval of time, line 12, representing the foremost extremity of the cold front, reaches Springfield, Illinois. At that time, the cold front will extend on a line approximately through Fort Smith, Arkansas; St. Louis, Missouri; and Springfield and Chicago, Illinois. It will also be noted that, while the wind direction at Springfield, Illinois, immediately prior to the approach of the cold front was from the southwest, after the cold front reaches Springfield, the wind direction will change to approximately due north. After the cold front has passed through Springfield and approaches Louisville, Kentucky, and Nashville, Tennessee, for example, when horizontal chart 2 is in the position indicated by dotted lines in Fig. 2, the wind direction at Springfield, Illinois, will change to northwest. At the same time, the height of the cold front above Springfield, Illinois, will increase to almost 15,000 feet, with alto-stratus cloud formations passing over Springfield and with thin cirrus clouds approaching it at an altitude of approximately 20,000 feet. From this information, a student may determine the altitude at which he may expect limited visibility, turbulence, ice formation, or other hazardous conditions.

Figure 4:
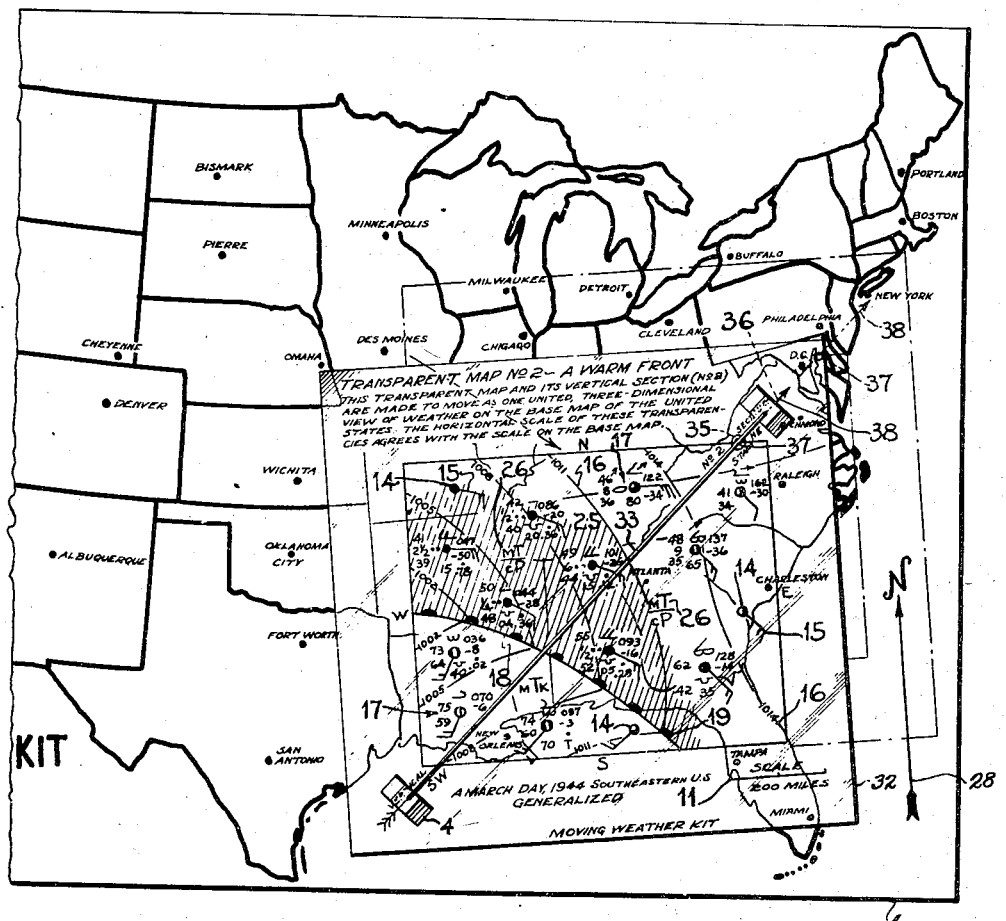
Fig. 4 is a plan of the apparatus, generally similar to the view shown in Fig. 2 but representing a different set of conditions.
Figure 5:
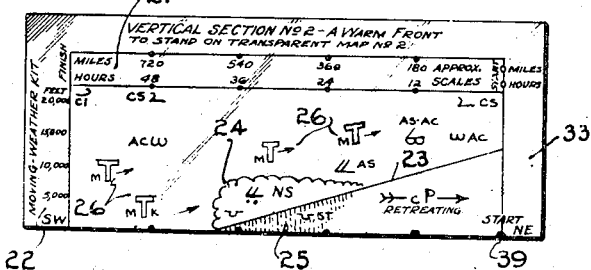
Fig. 5 is a side elevation of the vertical section representing generally the SW—NE line in Fig. 4.

The foregoing embodiment of the invention illustrates a cold front moving normally in a southeasterly direction, this being one of several typical meteorological conditions with which the student of meteorology is concerned; however, it is possible to represent movement of other typical meteorological conditions in similar fashion, such as a warm front, by means of the apparatus shown in Figs. 4 and 5.

The symbols of the atmospheric conditions shown on horizontal chart 32 and vertical chart 33 in Figs. 4 and 5 are substantially the same as those described in connection with horizontal chart 2 and vertical chart 3 in Figs. 1 to 3 inclusive. The principal difference is noted in warm front 18, shown on horizontal chart 32 of Fig. 4 with warm front symbols 19 protruding in the general direction of advance of the air mass which contains the warm front. Also, as indicated in the drawings, the axis of movement of the air mass is generally in a northeasterly direction in this embodiment of the invention.

Inasmuch as the axis of movement of the air mass containing the warm front is generally in a northeasterly direction, horizontal chart 32 is oriented with respect to map 1 in such manner that the north-south axis of horizontal chart 32 is generally parallel to north line 28 on map 1. location indicator 37 on horizontal chart 32 coincides with location indicator 35 on map 1 and direction indicator 38 on horizontal chart 32 is superimposed upon direction indicator 36 on map 1 so as to constitute a projection of the line represented by direction indicator 36. When the charts are thus oriented with respect to map 1, the forward extremity of the warm front as represented by line 18 will extend substantially through northern Florida, southern Alabama, Mississippi, Louisiana, and southern Arkansas.

Vertical chart 33 is placed substantially perpendicular to horizontal chart 32 and map 1 and is oriented with respect thereto by superimposing location indicator 39 on vertical chart 33, upon location indicators 37 and 35, on horizontal chart 32 and map 1, respectively, in much the same manner as described hereinbefore in connection with the charts of Figures 1, 2 and 3, illustrating the cold front. When vertical chart 33 is properly oriented with respect to horizontal chart 32 and map 1, it will constitute a representation of a typical atmospheric condition which exists in a warm front above the area covered by horizontal chart 32 substantially along an axis parallel to the axis of movement of the air mass which contains the warm front. For the sake of clarity, it may be desired to provide the area representing the warm front with a pink tint, while that portion which represents the cold front may be provided with a blue tint.

When it is desired to instruct the student in the movement of the warm front, it is only necessary to move horizontal chart 32 along a generally northeasterly direction on a projection of the direction indicator 36 as indicated by the arrow. When the chart is moved properly in that direction it will ultimately occupy the position indicated in Figure 4 by the dotted lines. Inasmuch as the general characteristics of the atmospheric condition represented by the chart shown in Figs. 4 and 5 remain substantially the same during movement over a geographical area, it is possible for the student to observe the effect of the movement of the atmospheric conditions from one location to another on the geographical map over a specified distance for a specified period of time as measured by the scales which appear on the respective charts. While it is generally desired to move the chart along one predetermined axis it is possible, if desired, to alter the axis after a movement of the chart along the predetermined axis over a short distance. This would illustrate a condition where there is brought about a change in the direction of the axis of movement of the air mass generally.

While the foregoing examples have been described with respect to the temperature characteristics of the air masses, and their corresponding movements, it is also possible, by means of the apparatus and methods of the present invention, to illustrate to students the movement of air masses which are characterized by their barometric properties. It is a well known phenomenon that air masses move generally toward the point of lowest barometric pressure. Therefore, if both a cold front and a warm front move from opposite directions toward a point of low barometric pressure, they will normally meet at the point of lowest pressure. This condition may be portrayed and illustrated conveniently by means of the present invention. For example, when it is desired to represent a "low" or a cyclonic storm condition, apparatus of the type shown in Figs. 6 to 9 inclusive may be employed. The area known as a "low pressure area" is indicated in Fig. 6 at the area of convergence of the cold front and the warm front. The condition is characterized by a maximum drop in barometric pressure at that point. Actually, the low pressure area also contains a precipitation area 25, which normally moves with the foremost extremity of both the cold front and the warm front.

On conventional weather maps, this condition is portrayed in a horizontal plane, but from such a representation it has been difficult for the student of meteorology to visualize clearly the position of the layers of air and other meteorological conditions in a vertical plane with respect to the low pressure area represented on the map. Even if the student is able to visualize the vertical disposition of the meteorological conditions under static conditions, it is oftentimes difficult for the student to visualize movement of the entire air mass and meteorological conditions over a specific area and to interpret the change of conditions that are manifested by such movement. For example, if the student is at ground level he can determine by the shift in direction of the wind whether he is north of the "low," south of it, east of it, or west of it. If, however, he is flying an aircraft over such area, it is more difficult for him to recognize his position with respect to the "low" unless he is able to visualize the vertical disposition of the air and cloud layers with respect to the horizontal representations of the atmospheric conditions. Thus, he must take into account vertical air movements and cloud dispersion in reckoning his position.

The apparatus shown in Figs. 6 to 8 inclusive is suitably adapted to represent the atmospheric conditions which exist in a plane extending upward from the ground at one or more points generally along the axis of movement of the air mass in the vicinity of a cyclonic storm or "low." Thus, it will be seen that after orienting horizontal chart 42 with respect to map 1 in much the manner hereinbefore described in connection with horizontal charts 2 and 32, it is then possible to orient vertical charts 43a and 43b with respect to horizontal chart 42. For this purpose, vertical chart 43a is provided with location indicator 47a and vertical chart 43b is provided with location indicator 47b to be superimposed upon horizontal chart 42, thereby to cooperate with location indicators 45a and 45b thereon. Fig. 7 represents the chart 43a as it passes, southeast of the low, from southwest to northeast through a portion of the cold front, the warm sector, and the warm front. Substantially parallel to chart 43a, but northwest of the low, chart 43b, as shown in Fig. 8, passes in a generally northeast direction through a portion of the cold front, the occluded front, and the warm front. If, however, it is desired to represent the conditions extending throughout the area extending between the parallel vertical planes, it is possible to use a vertical chart 43c in the form of a solid block such as that shown in Fig. 9 of the drawing wherein the atmospheric conditions are shown in both dimensions at ground level and in vertical dimensions above ground level. Moreover, it is possible to move the block 43c substantially parallel to or coincident with the direction of the movement of the air mass to represent a condition which might ordinarily be met while flying over an area affected by that atmospheric condition.

Figure 10:
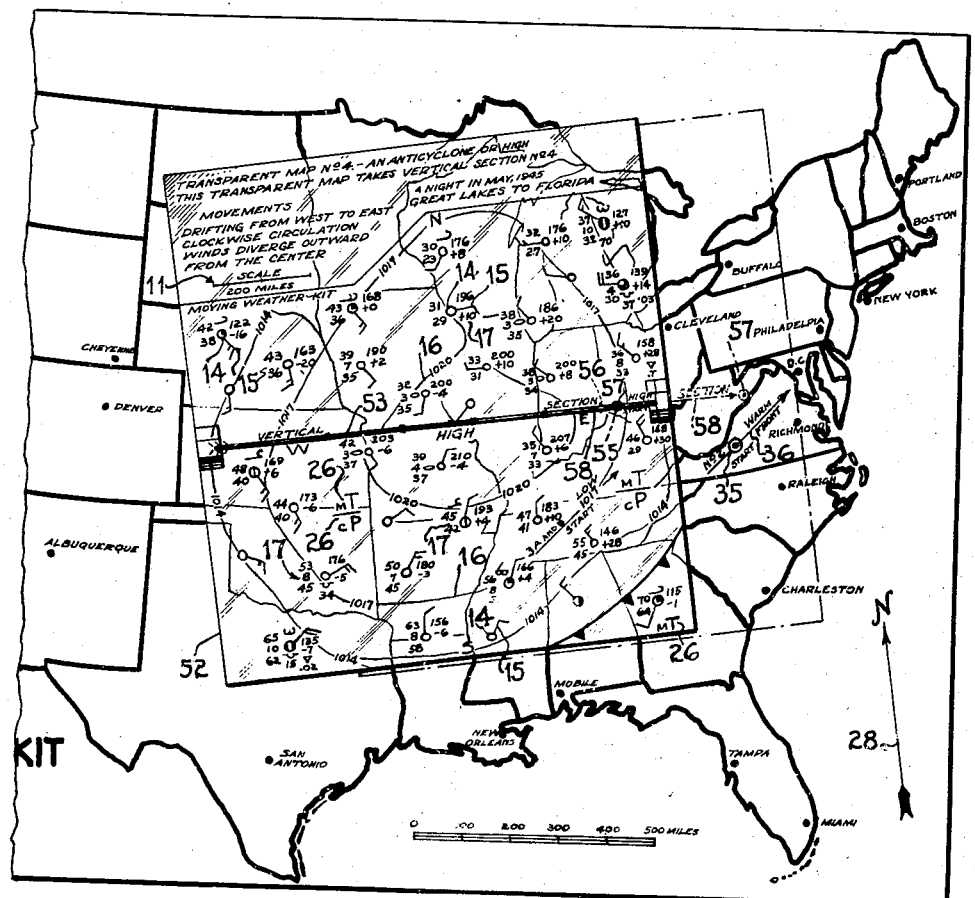
Fig. 10 is a plan of the apparatus generally similar to the views shown in Figs. 2, 4 and 6.
Figure 11:
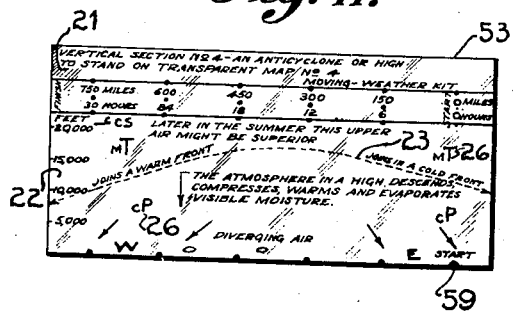
Fig. 11 is a side elevation of the vertical section representing generally the line W—E in Fig. 10.

Another meteorological condition which may be encountered and which may be represented by the showing in Figs. 10 and 11 of the drawings, is what is referred to as an anti-cyclone or "high." In fact, this is the type of condition which normally exists when we have what is commonly called "good weather." While navigation in such atmospheric conditions is relatively less hazardous than traveling in or through a cold front, warm front or "low," it is advisable for the student to be familiar with the characteristics of this particular condition above ground level as well as at ground level. Although its characteristics at ground level may be shown to advantage on the ordinary weather map, the present invention provides apparatus and means for exhibiting its vertical as well as its horizontal characteristics, in motion, by employing horizontal chart 52 and vertical chart 53 in cooperation with map 1. The charts are oriented with respect to the map in the manner described hereinbefore in connection with Figs. 1 to 9, inclusive. That is, the orienting means, including location indicator 57 and direction indicator 58 on horizontal chart 52, are superimposed upon corresponding orienting means, including location indicator 55 and direction indicator 56, on map 1. Also, location indicator 59 on vertical chart 53 is superimposed upon location indicator 57 on horizontal chart 52. When thus oriented, the charts may be manipulated to illustrate movement of the meteorological condition from a selected starting point, as shown in Fig. 10, to the position shown in dotted lines in that figure.

While the apparatus of the present invention has been illustrated in the foregoing embodiments as consisting of a plurality of cooperating charts having orienting means printed thereon, it is within the scope of the present invention to provide analogous orienting means with mechanically interengaging elements. For example, if desired, map 1 and horizontal chart 2 may be provided with suitable slots and enlarged portions into which corresponding extensions and protuberances on horizontal chart 2 and vertical chart 3 may be lodged in suitable fashion.

It is also within the scope of the present invention to employ the apparatus and methods set forth herein for representing meteorological conditions over water as well as land. It will be further understood that the representations shown in the foregoing embodiments of the invention may be varied from the standpoint of direction and magnitude depending on the latitude and longitude in which the meteorological conditions are being portrayed.

It is also within the scope of the present invention to employ a plurality of charts, simultaneously, to indicate what is commonly referred to as an "occluded front" where, for example, a warm front and a cold front overlap. Moreover, the apparatus may be manipulated to demonstrate the axis of movements of the air mass in various directions in accordance with the conditions prevailing in the portion of the world in which the geographical area is selected.

While the charts illustrated in the foregoing embodiment of the invention are indicated as being made of transparent material and the map is opaque, under certain circumstances it may be desirable for either or both the horizontal and vertical charts to be made of opaque material. Likewise, it is within the scope of the present invention to provide a transparent map, in which case the horizontal chart may be oriented beneath the map and moved with respect thereto in suitable fashion. Also, if desired, either the horizontal chart or the vertical chart may be used independently of the other, either in conjunction with or in the absence of the map.

Having described the methods of and apparatus for illustrating meteorological conditions in accordance with the present invention, it is intended that the patent shall cover by suitable expression in the appended claims wherein I claim:

1. An instructional device for demonstrating the progress of climatic conditions within and above a geographical area comprising a base in the form of a geographical map; a first chart slidable over the surface of said base, said first chart including means for orientation thereof with respect to a selected area on said base and having representations of a mobile climatic condition at ground level within said selected area; and a second chart disposed in a plane extending upwardly from said first chart and substantially parallel to normal axis of movement of said mobile climatic condition, said second chart having representations of the mobile climatic condition above ground level within said selected area on said base and including means for orientation of such representations with respect to the representations on said first chart, said first chart and said second chart being movable as a unit over the surface of said base.

2. An instructional device as set forth in claim 1 in which the first chart is transparent.

3. An instructional device for demonstrating the progress of climatic conditions within and above a geographical area comprising a base in the form of a geographical map; a first chart including means for orientation thereof with respect to a selected area on said base and having representations of a mobile climatic condition at ground level within said selected area; a second chart disposed in a plane extending upwardly from said first chart and substantially parallel to the normal axis of movement of said mobile climatic condition, said second chart having representations of the climatic condition above the ground level within the selected area on the base and including means for orientation of said representations with respect to the representations on said first chart; and a third chart disposed in a plane extending upwardly from said first chart and substantially parallel to the normal axis of movement of said mobile climatic condition but in a plane different from that in which said second chart lies, said third chart having representations of said mobile climatic conditions in said different plane above ground level within said selected area on the base and including means for orientation of such representations with respect to the representations on said first and second charts; said first, second and third charts being movable as a unit over the surface of said base.

4. An instructional device for demonstrating the progress of climatic conditions within and above a geographical area comprising a base in the form of a geographical map; a first chart including means for orientation thereof with respect to a selected area on said base and having representations of a mobile climatic condition at ground level within said selected area; a second chart; and means for supporting said second chart in a plane extending upwardly from said first chart and substantially parallel to the normal axis of movement of said mobile climatic condition, said second chart having representations of the mobile climatic condition above ground within said selected area on said base and including means for orientation of such representations with respect to the representations on said first chart; said first and second charts being movable as a unit over the surface of said base.

RUSSELL R. SPAFFORD.

REFERENCES CITED

The following references are of record in the file of this patent:

UNITED STATES PATENTS

| Number | Name | Date |
|---|---|---|
| 772,343 | Diehl | Oct. 18, 1904 |
| 1,312,961 | De Voe | Aug. 12, 1919 |
| 2,205,692 | Johnson et al. | June 25, 1940 |
| 2,333,162 | Eddy | Nov. 2, 1943 |
| 2,394,282 | Withers | Feb. 5, 1946 |
| 2,397,063 | Van Zandt | Mar. 19, 1946 |
| 2,416,754 | Horr | Mar. 4, 1947 |